United States Patent
Kodialam et al.

(10) Patent No.: US 7,394,763 B2
(45) Date of Patent: Jul. 1, 2008

(54) ROUTING FOR NETWORKS WITH CONTENT FILTERING

(75) Inventors: Muralidharan S. Kodialam, Marlboro, NJ (US); Tirunell V. Lakshman, Morganville, NJ (US); Sudipta Sengupta, Aberdeen, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 784 days.

(21) Appl. No.: 10/851,493

(22) Filed: May 21, 2004

(65) Prior Publication Data

US 2005/0259648 A1 Nov. 24, 2005

(51) Int. Cl.
- G01R 31/08 (2006.01)
- G06F 11/00 (2006.01)
- G08C 15/00 (2006.01)
- H04J 1/16 (2006.01)
- H04J 3/14 (2006.01)
- H04L 1/00 (2006.01)
- H04L 12/26 (2006.01)

(52) U.S. Cl. ............... 370/230; 370/238; 370/252; 370/395.21

(58) Field of Classification Search ........... 370/229, 370/230, 230.1, 231, 235, 236, 236.1, 236.2, 370/238, 238.1, 351, 395.21
See application file for complete search history.

(56) References Cited

U.S. PATENT DOCUMENTS

| | | | |
|---|---|---|---|
| 6,628,670 B1 | 9/2003 | Galand et al. | |
| 6,952,682 B1 * | 10/2005 | Wellman | 705/37 |
| 2003/0028670 A1 | 2/2003 | Lee et al. | |
| 2003/0099237 A1 * | 5/2003 | Mitra et al. | 370/393 |
| 2003/0123465 A1 | 7/2003 | Donahue | |
| 2003/0169749 A1 * | 9/2003 | Huang et al. | 370/401 |
| 2004/0001498 A1 * | 1/2004 | Chen et al. | 370/401 |

OTHER PUBLICATIONS

"An Ant-Algorithm for the Weighted Minimum Hitting Set Problem," by A. Cincotti, et al., 0-7803-7914-4/03, 2003 IEEE, pp. 1-5.

* cited by examiner

Primary Examiner—Seema S. Rao
Assistant Examiner—Christine Duong

(57) ABSTRACT

A network of nodes interconnected by links has content filtering specified at certain nodes, and routing of packet connections through the network is generated based on the specified content-filtering nodes. The network is specified via a content-filtering node placement method and a network-capacity maximization method so as to apply content filtering to packets for substantially all traffic (packet streams) carried by the network.

24 Claims, 3 Drawing Sheets

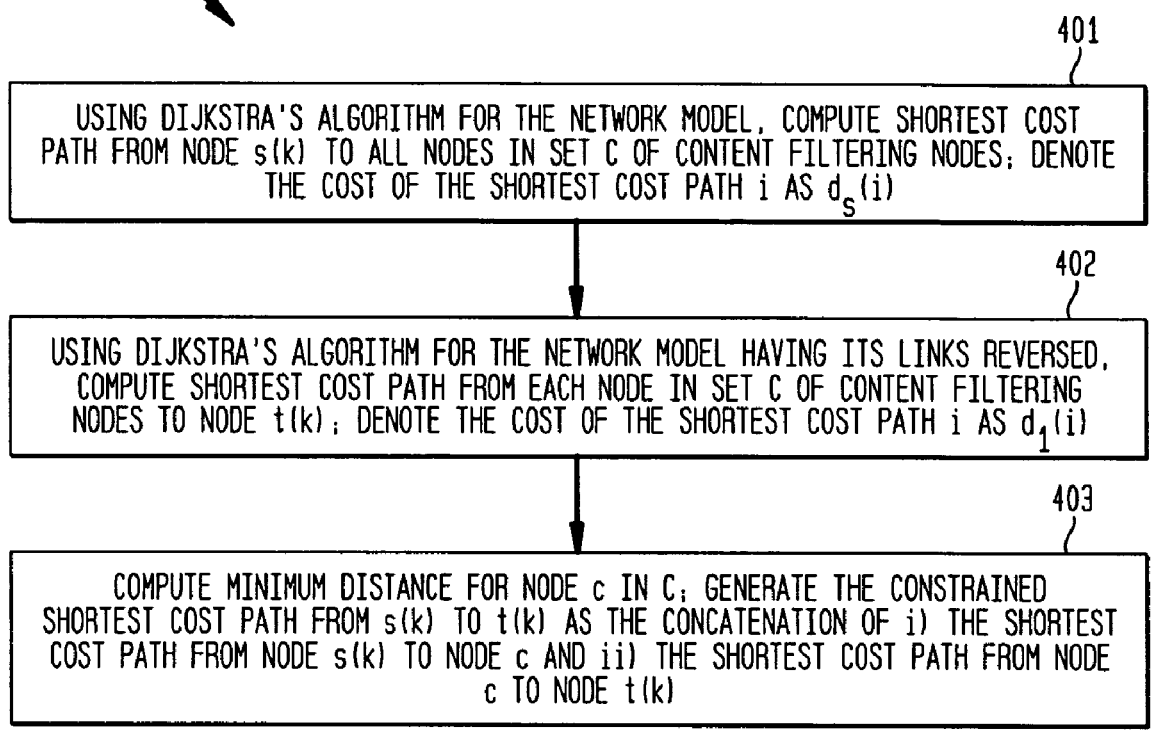

ROUTING FOR NETWORKS WITH CONTENT FILTERING

BACKGROUND OF THE INVENTION

1. Field of the Invention

The present invention relates to routing in a telecommunications network, and, more particularly, to routing with allocation of nodes that perform content filtering in the network.

2. Description of the Related Art

In an interconnected communication network, users establish connections between a source node and a destination node with a stream of data that is transferred through the network over a network path. The data of one or more connections constitutes traffic over the network. Optical networks are typically characterized by a set of optical switches (i.e., nodes) connected via optical links. Packet networks (which may be implemented using optical networks) are typically characterized by routers (also considered nodes) interconnected by electrical or optical links. A network path for a connection between a given source-destination (node) pair is defined by a set of nodes (the source and destination node pair and any intermediate nodes) interconnected by a set of links coupled to the nodes carrying the data stream, or flow, of the connection. Each node and each link has a capacity corresponding to the traffic it may carry, and "capacity" may be a general term describing bandwidth, effective bandwidth, link quality, or similar link-transmission characteristic.

Each link of a network has a corresponding capacity to transfer data, which link capacity is typically expressed as a link characteristic such as bandwidth or effective bandwidth (a quantity that takes into account transmission requirements such as buffer and/or transmission delay, packet loss, and QoS guarantees).

Increasingly, packet networks are subject to malicious attacks through propagation of computer viruses and worms. The growth of fast-propagating attacks has identified a need for network-based mechanisms for quarantining or containing these attacks. Network-aided containment might be used to effectively augment other defense mechanisms such as those aimed at reducing host vulnerabilities or limiting damage to infected hosts. Ad-hoc containment using several mechanisms, such as content filtering of messages for Code-Red signatures, blacklisting addresses, and blocking access to specific ports, is typically used to protect individual networks. Among common containment methods, content filtering is preferred.

Content filtering at highly used points of the Internet, such as the top ten Internet service providers (ISPs), is generally more effective than content filtering at the individual customer network level. Content-filtering mechanisms might be activated faster than other host-based schemes because identifying and generating worm signatures (used by content-filtering mechanisms) might be accomplished faster than understanding the mechanisms used for propagation by a new worm. Also, once a worm signature has been identified, network-based content-filtering mechanisms might be activated faster since the worm signatures are distributed to fewer nodes.

For containment by content filtering to be effective, all of the traffic carried by the network should be filtered. Filtering requires complete examination of each packet's contents to identify worm signatures, making content filtering an expensive operation in terms of network resource use (e.g., processing and delay). Available content-filtering capabilities should be optimally placed in nodes of the network to be used effectively. Random (or improper) selection of content-filtering nodes might force routing of packets along longer paths, leading to increased bandwidth usage per connection and lower network throughput. Thus, random placement of content-filtering capabilities might result in significant waste of network capacity in routing traffic to these sub-optimally placed content-filtering nodes.

SUMMARY OF THE INVENTION

In accordance with exemplary embodiments of the present invention, a network of nodes interconnected by links has content filtering specified at certain nodes, and routing of packet connections through the network is generated based on the specified content-filtering nodes. The network is specified via a content-filtering node placement method and a network-capacity maximization method so as to apply content filtering to packets for substantially all traffic (packet streams) carried by the network.

In accordance one exemplary embodiment of the present invention, routing for one or more connections in a network of nodes interconnected by links is generated by (a) providing a list of nodes having content filtering for the network; (b) formulating a routing-with-content-filtering problem (RCFP) for a relatively maximized network capacity subject to a set of constraints such that flow of each connection passes through at least one of the list of nodes having content filtering; and (c) solving the RCFP to generate a routing solution that specifies routing for the one or more connections through the network.

In accordance another exemplary embodiment of the present invention, a routing solution for a network of nodes interconnected by links and having at least one connection routed through the network is generated, wherein 1) one or more of the nodes is included in a set of content filtering nodes, each content filtering node adapted to apply content filtering to a connection passing through the node, and 2) each connection passes through at least one content filtering node. The routing solution is generated by (a) initializing each weight and each flow associated with each link of the network; (b) routing a demand for each connection, and (c) repeating (a) and (b) until the dual constraints are met. The demand is routed for each connection by: (b(i)) generating a shortest path for the demand through at least one node of the set of content filtering nodes, (b(ii)) determining an incremental amount of flow of the demand, (b(iii)) routing the incremental amount of flow along the shortest path, (b(iv)) updating the flow and the weight of each link based on the incremental amount of flow, and (b(v)) repeating steps (b(i)) through (b(v)) until the demand is routed.

BRIEF DESCRIPTION OF THE DRAWINGS

Other aspects, features, and advantages of the present invention will become more fully apparent from the following detailed description, the appended claims, and the accompanying drawings in which:

FIG. 4 shows an exemplary method that may be employed by the method of FIG. 3 to compute constrained shortest paths.

DETAILED DESCRIPTION

Figure 1:
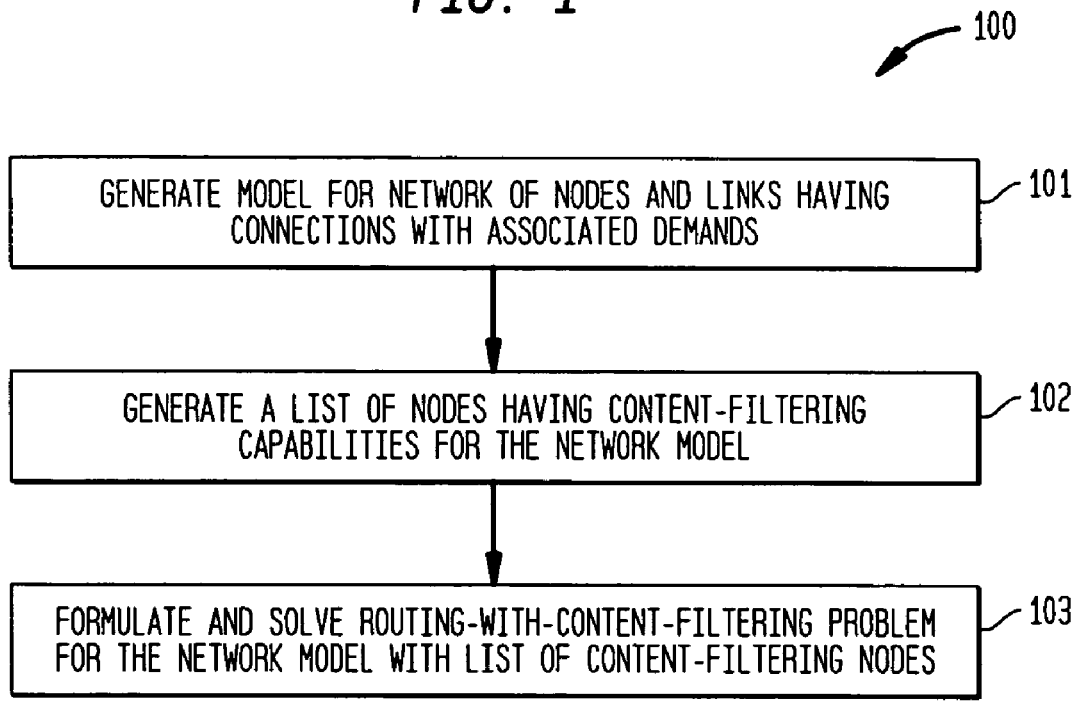
FIG. 1 shows an exemplary method of routing for networks with content filtering in accordance with an exemplary embodiment of the present invention.

FIG. 1 shows an exemplary method 100 of routing for networks with content filtering ("content-filtering routing") in accordance with an exemplary embodiment of the present invention. When the method of FIG. 1 terminates, the method specifies 1) particular nodes of the network of nodes interconnected by links that are to implement content filtering of traffic passing through the node, and 2) an optimal method of routing (based on a given cost function or metric) the connections through the network given the particular nodes implementing content filtering.

At step 101, content-filtering routing method 100 generates a model for a network of nodes and links having a set of connections with associated demands. A connection represents, for example, a packet connection routed through the network between a corresponding source and destination (or ingress and egress) node pair. The associated demand has a quantity, such as bandwidth or effective bandwidth, that is supported for the connection.

At step 102, method 100 generates, by a content-filtering node placement method, a list of nodes having content filtering for the network model of step 101. In accordance with exemplary embodiments of the present invention, a heuristic method for generating the list of content filtering nodes i) formulates a hitting set problem (HSP) for content filtering and ii) generates an approximate solution to the HSP.

At step 103, method 100 generates, by a network-capacity maximization method, a routing table for the network model of step 101 under the constraint that the traffic for the given connections must pass through at least one node applying content filtering. Step 103 formulates and solves a routing-with-content filtering problem (RCFP) as a linear programming problem (LPP).

In accordance with exemplary embodiments of the present invention, the RCFP is solved by generating a dual of the primal LPP for the RCFP and applying a primal-dual method to generate a $(1+\epsilon)$ approximate solution. The value of $\epsilon$ is an arbitrarily selected, relatively small number (e.g., $0<\epsilon\leq 1$), whose size is related to the error and computation length of the approximate solution.

Exemplary methods for steps 101, 102, and 103 are now described. For step 101, the network may be modeled as follows. The network G is composed of a set N of nodes interconnected by a set E of links (also termed edges, which for the present network are directed edges since packet flows are in one direction), and so the network is defined as $G=(N, E)$. The magnitude of the set N is the number n of nodes (i.e., $|N|=n$) and the magnitude of the set E is the number m of edges (i.e., $|E|=m$). A directed link in the network from node i to node j is denoted as $(i, j)$, and the capacity of link $(i, j)$ is denoted by $u_{ij}$. To simplify the notation, a link is also represented by e equivalent to $(i,j)$, and capacity of link e is denoted $u_e$.

All traffic demands in the network are between a set B of ingress/egress (border) node pairs in the network (i.e., $B \subset N$ where "$\subset$" is the mathematical "subset of"). The capability to filter content is available at only a subset C of nodes in the network (i.e., $C \subset N-B$) which subset includes only non-border nodes, referred to herein as content-filtering nodes. Thus, every path along which packets are routed between an ingress-egress node pair in B passes through at least one node in C. Each of the traffic demands between an ingress-egress node pair in B is referred to as a commodity. Denoting the total number of commodities by K, $K \leq |B|(|B|-1)$.

For the following described embodiments, s(k) denotes the source node of the kth commodity, t(k) the destination node of the kth commodity, and d(k) the value of the demand for commodity k. Thus, for each commodity k, d(k) units of flow are routed from node s(k) to node t(k).

Returning to FIG. 1, at step 102, the set C of content-filtering nodes is determined in a manner that preferably does not depend on traffic assumptions since installation of content-filtering capability at selected nodes is made a priori. Content filtering might appear only at a limited number of nodes within the network, and every ingress-egress path in the network passes through at least one content-filtering node. Packets for commodity k are not necessarily routed along a single path from s(k) to t(k), but may be routed over a set $P_{k,L}$ of L shortest (hop) paths from s(k) to t(k) as candidate routing paths for routing each commodity k. These L shortest paths for each commodity k might be computed in order of increasing cost in an efficient fashion. These L shortest paths might be computed, for example, using Yen's k-shortest path algorithm described in J. Y. Yen, "Finding the K Shortest Loopless Paths in a Network," Management Science, vol. 17, no. 11, July 1971, which is incorporated herein by reference. Content-filtering nodes are desirably available on some of these candidate routing paths for each commodity k.

Selection of content-filtering nodes in accordance with an exemplary embodiment of the present invention may satisfy the following theorem: Given a set of intermediate nodes $S_k$ along candidate routes for commodity k for $k=1,2,\ldots,K$, the problem of computing a set C of content-filtering nodes with given cardinality p such that C contains at least one node from the set $S_k$ of intermediate nodes from candidate routes for the maximum number of commodities k is NP-hard. There exists a polynomial time approximation algorithm for this problem with guaranteed approximation factor of $$1-\left(1-\frac{1}{p}\right)^p > \left(1-\frac{1}{e}\right) \approx 0.632.$$

Figure 2:
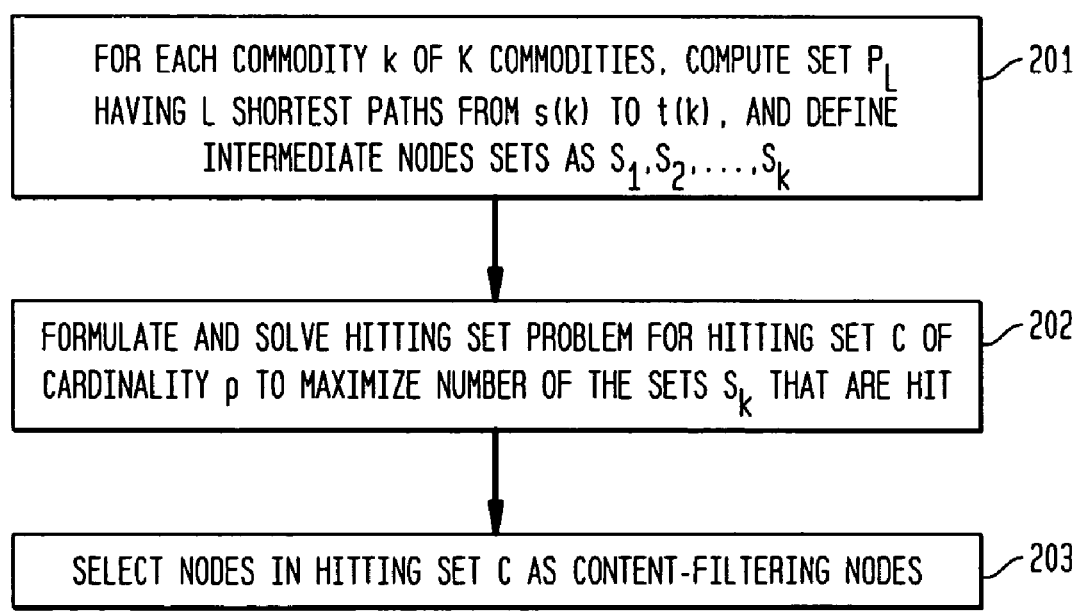
FIG. 2 shows an exemplary method of selecting a set of content-filtering nodes in a network.

FIG. 2 shows an exemplary method of selecting a set of content-filtering nodes in a network as might be employed by step 102 of FIG. 1. At step 201, for each commodity $k=1, 2, \ldots, K$, a set $P_{k,L}$ having L shortest paths from s(k) to t(k) is computed. The set $S_k$ denotes the set of intermediate nodes along the candidate routing paths in $P_{k,L}$ for each commodity k.

At step 202, the hitting-set problem (HSP) with instance $S_1, S_2, \ldots, S_K$ and given cardinality p of the hitting set C is solved so as to maximize the number of sets $S_k$ that are hit. At step 203, the nodes in hitting set C are selected as content filtering nodes.

As an aid to understanding the present invention, a background discussion of the HSP follows. Given a single path $P_k$ between ingress-egress node pair s(k) and t(k) along which commodity k should be routed, for all $k=1,2,\ldots,K$, the set $S_k$ denotes the set of intermediate nodes along path $P_k$. To ensure that packets of each commodity k get filtered along the routed path $P_k$, the set C of content-filtering nodes desirably contains at least one node from each set $S_k$ for all k (i.e., $S_k \cap C \neq \emptyset$ $\forall k$, where mathematical term "$\cap$" is intersection, "$\emptyset$" is the null set, and "$\forall$" is "for all"). Moreover, to generate as few content-filtering nodes as possible in set C, such set C is desirably of minimum cardinality (in set theory, cardinality refers to the number of members in the set). The HSP is stated as follows: given a collection of subsets $S_1, S_2, \ldots, S_l$ from universal set S (i.e., $S_k \subset S$ $\forall k$, $1 \leq k \leq l$), find a subset C, $C \subset S$, of minimum cardinality that contains (i.e., "hits") at least one element from each set $S_k$ $\forall k$.

A heuristic method used as a guaranteed approximation factor algorithm for the HSP is as follows. For any element a∈S, compute the number κ(a) of sets $S_k$ that contain element a. Select the element $\bar{a}$ with maximum value κ(a) to include in the hitting set C. Remove the sets $S_k$ that contain element $\bar{a}$ and repeat computing the number κ(a), selecting a new element $\bar{a}$ with new maximum value κ(a), and remove the sets $S_k$ that contain new element $\bar{a}$. Continue this recursion on the remaining sets until all sets are removed. This guaranteed approximation factor algorithm exhibits an approximation factor of natural log l (ln l). Thus, the size of the set C is at most ln l times the size of the minimum-cardinality hitting set. A variant of the HSP involves finding a set of given cardinality p, where |C|=p, such that C hits the maximum number of sets $S_k$. For this variant of the HSP, if the guaranteed approximation factor algorithm is computed to the point when |C|=p, an approximation factor of $$1-\left(1-\frac{1}{p}\right)^p > \left(1-\frac{1}{e}\right) \approx 0.632$$

is guaranteed.

The following pseudo-code may be employed to implement the exemplary method of FIG. 2.
100 for each k=1,2, . . . , K, do
101 Compute set $P_{k,L}$ of L shortest (hop) paths $\{P_1^k, P_2^k, \ldots, P_L^k\}$ from
102 s(k) to t(k) using a L-shortest paths algorithm (e.g., Yen's or Lawler);
103 $S_k \leftarrow$ set of intermediate nodes along paths $P_1^k, P_2^k, \ldots, P_L^k$;
104 end for
105 T←{$S_1, S_2, \ldots, S_K$}
106 S←N—B; (set of non-border nodes)
107 C←∅
108 while |C|<p do
110 N(a)←number of times node a appears in the collection of sets
111 in T, ∀a∈S—C;
112 $\bar{a}$← node a for which N(a) is maximum;
113 C←C∪{$\bar{a}$};
114 for each k such that $\bar{a} \in S_k$ do
115 T←T−{$S_k$}
116 end for
117 end while
118 Output C as set of content-filtering nodes Given the set C of content filtering nodes, link capacities for the set E of edges (links) in the network, and the K demands for each of the commodities, d(k), in accordance with the present invention, a routing-with-content-filtering problem (RCFP) is formulated that computes a maximum multiplier λ such that λd(k) units of demand might be routed from s(k) to t(k) for all k under the constraint that each routed path passes through at least one content-filtering node in C. The primal LPP maximizes λ for equation (1), (2), and (3). The input parameters are i) the network graph including the nodes n and links m in the network, ii) the number K of commodities with corresponding demands d, and iii) the set of content filtering nodes.

Returning to FIG. 1, the RCFP of step 103 is formulated as a path-indexed (maximization) linear program with the set C of content-filtering nodes generated in step 102. For any commodity k, $P_k$ denotes the set of all paths from node s(k) to node t(k) that pass through any content-filtering node in the set C. The variable x(P) denotes the traffic routed on path P.

The total demand routed for commodity k along all paths in $P_k$ is equivalent to λd(k) and given in equation (1):

$$\sum_{P:P\in P_k} x(P) = \lambda d(k) \; \forall \, k \tag{1}$$

The total traffic on link e is the sum of flows of all commodities routed along all paths that contain link e. Thus, the capacity constraint on link e is as given in equation (2):

$$\sum_k \sum_{P:P\in P_k} x(P) \leq u_e \; \forall \, e \in E \tag{2}$$

In addition, the flows of the links are non-negative, expressed as in equation (3):

$$x(P) \geq 0 \, \forall P \in P_k \forall k \tag{3}$$

One solution of the linear programming formulation for the RCFP in accordance with the present invention attempts to find a maximum λ for equation (1) subject to the constraints of equations (2) and (3).

The maximum value of λ generated by the solution to the RCFP is denoted λ*. If λ*≧1, then the given demands can be routed on the network, and the explicit paths along which demands are routed are determined from the paths that yield the solution of the RCFP. If the value λ*<1, then all the given demands cannot be simultaneously routed on the network for the given solution to the RCFP. However, if the value λ*<1, then a network designer might select one of two options: 1) scale the demands down by 1/λ*, which yields a set of demands feasible for routing under the given link capacities, or 2) scale the link capacities up by λ* to accommodate routing of all the given demands.

In practice, the solution of the RCFP might be computationally cumbersome, and so some embodiments of the present invention employ a fast combinatorial algorithm for the solution of the RCFP, assuming that set C of content-filtering nodes is given. A dual of the primal LPP for the RCFP is formulated, and the fast combinatorial algorithm then employs a primal-dual approach that augments flows in the primal solution and updates weights in a multiplicative fashion in the dual solution until a threshold is met.

The dual formulation of the linear program for the RCFP associates i) a variable z(k) with each commodity k corresponding to the constraint of equation (1) and ii) a variable w(e) with each link e∈E corresponding to the constraint of equation (2). The dual linear program minimizes the quantity of equation (4) subject to the constraints of equations (5), (6), and (7):

$$\min \sum_{e\in E} u_e w(e), \tag{4}$$

subject to:

$$\sum_{e\in P} w(e) \geq z(k) \; \forall \, P \in P_k, \forall \, k \tag{5}$$

-continued $$\sum_k d(k)z(k) \geq 1 \quad (6)$$

$$w(e) \geq 0 \ \forall \ e \in E \quad (7)$$

The constraint of equation (5) implies that, for each commodity k, z(k) can be set to be the length of the shortest path from s(k) to d(k) under link costs w(e). Hence, a set of weights w(e), $\forall e \in E$, is a dual feasible solution if the constraint of equation (6) is satisfied after z(k) is determined. The constraint of equation (7) forces the link costs to be positive-valued. Consequently, the primal LPP, to maximize λ, maximizes the utilization of each link in the network, while the dual minimizes the maximum utilization of each link in the network.

The primal-dual algorithm is an iterative method that operates as follows. At least one phase is employed, with each phase employing at least one iteration. At each phase, one or more iterations are employed to incrementally route d(k) units of flow from node s(k) to t(k) for each commodity k. At the end of each phase, all commodities k=1,2,...,K have been routed through at least one node in the set C, and a test checks whether the constraint of equation (5) of the dual of the primal LPP for the RCFP is satisfied. When the constraint of equation (4) of the dual objective function value is greater than 1, the primal-dual algorithm terminates.

Figure 3:
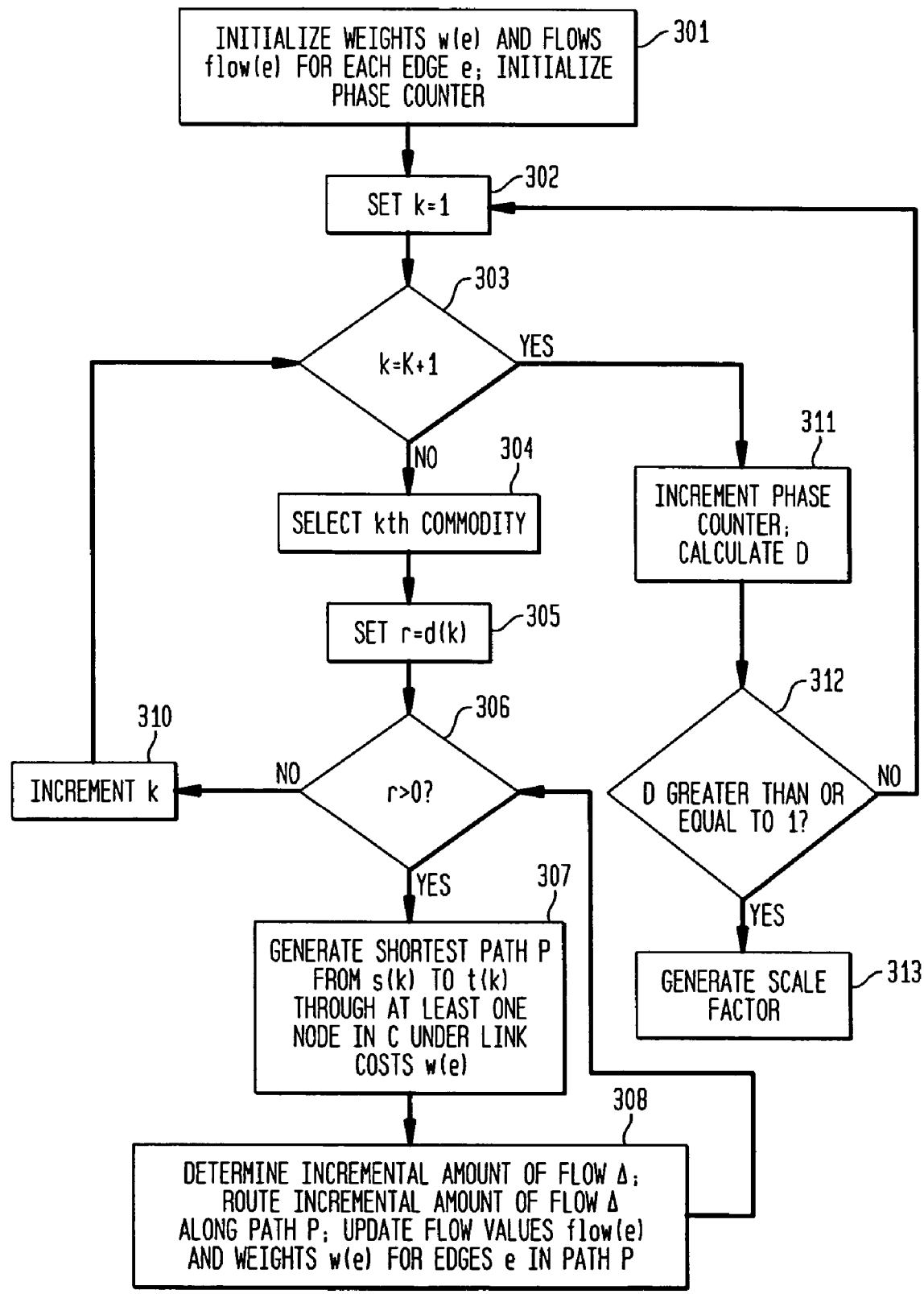
FIG. 3 shows an exemplary method of routing given a set of content-filtering nodes in accordance with the present invention.

FIG. 3 shows an exemplary method of generating a solution to the RCFP employing a (1+ε) approximation using a primal-dual algorithm. At step 301, for each edge e in the set of edges E, the corresponding link weights are initialized as w(e)=(δ/$u_e$) (the quantity δ depends on ε as described subsequently) and the corresponding routed flow for each edge, flow(e), is initialized to zero (i.e., flow(e)=0 $\forall e \in E$). In addition, a counterphase for the number of phases is also initialized to zero. At step 302, the variable k corresponding to the kth commodity is set to 1. The flow of value d(k) of commodity k is then routed from s(k) to t(k) in multiple iterations as follows.

At step 303, a test determines whether all K commodities have been routed (i.e., k=(K+1) and so the last (Kth) commodity was processed in the previous iteration). If the test of step 303 determines that the k=(K+1), then the method advances to step 311, described subsequently. If the test of step 303 determines that the k<(K+1), then the method advances to step 304. At step 304, the kth commodity is selected, and the method advances to step 305.

At step 305, a temporary flow variable r is set to the value of demand d(k). At step 306, a test determines whether the flow variable r is greater than zero, indicating that flow of the demand d(k) remains to be routed. If the test of step 306 determines that r is less than or equal to zero, then the method advances to step 310, described below. If the test of step 306 determines that r is greater than zero, then the method advances to step 307.

At step 307, a shortest path $P \in P_k$ is computed from s(k) to d(k) (i.e., a shortest path that passes through at least one content-filtering node in the set C) under link costs w(e) $\forall e \in E$.

At step 308, an incremental amount of flow is routed for the shortest path P generated in step 307, and the flows and weights for the edges e that are in path P are updated. Since path P is constrained to pass through some node in C, it may traverse a link more than once. The variable $N_P(e)$ is the number of times that path P traverses link e. Then, for the purpose of routing flow along this path P, the capacity of link e is not $u_e$ but effectively $u_e/N_P(e)$. Hence, the minimum (effective) link capacity u on path P is given by $$u = \min_{e \in P} \frac{u_e}{N_P(e)}.$$

An incremental amount Δ of flow from r is sent along path P in an iteration. The incremental amount Δ of flow from r is the minimum of (i) the quantity u and (ii) the remaining amount of flow that is to be sent from s(k) to t(k) to make a total of d(k) (which may equal r). After the flow of value Δ is sent along path P, the total flow on each link e∈P is increased by $N_P(e)\Delta$ (i.e., flow(e) is incremented by $N_P(e)\Delta$), and the weights w(e) $\forall e \in P$ are updated as given in equation (8):

$$w(e) \leftarrow w(e)\left(1 + \frac{\varepsilon N_P(e)\Delta}{u_e}\right) \forall \ e \in P. \quad (8)$$

After this update of the weights w(e), the temporary flow variable is updated as r←r−Δ, and the method returns to step 306.

If the test of step 306 determines that r is equal to zero, then the entire flow of commodity d(k) is routed, an iteration has completed, and the method advances to step 310. At step 310, the value of k is incremented by 1, and the method returns to step 303. As described previously, if the test of step 303 determines that the k=(K+1), then each of the commodities demands d(k) is routed, and the method advances to step 311.

At step 311, the value of counter phase is incremented by 1, and a variable D is set to the value of equation (9):

$$D \leftarrow \sum_{e \in E} u_e w(e). \quad (9)$$

Equation (9) is equivalent to the dual objective function value of the left-hand side of equation (6).

At step 312, a test determines whether the variable D is greater than or equal to one. If the test of step 312 determines that the variable D is less than one, then the dual constraint is not satisfied, a phase is complete, and the method returns to step to 302 to begin another phase. If the test of step 312 determines that the variable D is greater than or equal to one, then the dual constraint is satisfied and the method advances to step 313.

At step 313, the scale factor λ is computed and provided as output. After step 312, the dual-feasibility constraints are satisfied, but the link-capacity constraint in the primal solution might be violated, since the method employs original (and not residual) link capacity $u_e$ at each iteration. To account for the violation of the link-capacity constraint, traffic (flows) on each link are scaled uniformly so that capacity constraints are obeyed. Consequently, the scale factor λ is computed and employed for scaling, as mentioned above. This scale factor λ is computed based on the inverse of the maximum violation of link-capacity value, which is the maximum ratio of i) routed flow over edge (link) e when the algorithm terminates to ii) the original capacity $u_e$ of the edge e. This maximum ratio is also scaled by the number of phases that the method completes. Consequently, scale factor λ is generated as phase/scale_fact, where scale_fact is as given in equation (10):

$$\text{scale\_fact} = \max_{e \in E}(\text{flow}(e)/u_e). \quad (10)$$

When the method of FIG. 3 terminates, in addition to providing the scale factor, the repetitive process of routing demands with shortest-path computations by increments generates a routing solution for routing the demands of the connections.

The following pseudo-code may be employed to implement the exemplary method of FIG. 3.

---

$w(e) \leftarrow \dfrac{\delta}{u_e} \; \forall \; e \in E;$ flow(e) $\leftarrow 0 \; \forall e \in E;$
phase $\leftarrow 0;$
repeat
    for each k=1,2, ..., K do
        r=d(k)
        while r>0
            Compute shortest path P from s(k) to t(k) under link costs
            w(e) $\forall e \in E$ that passes through at least one node in C;
            N(e) $\leftarrow$ number of times link e appears on path P, $\forall e \in P$ $u \leftarrow \min_{e \in P} \dfrac{u_e}{N(e)};$ $\Delta \leftarrow \min(r, u);$
flow(e) $\leftarrow$ flow(e) + N(e)$\Delta$, $\forall e \in P$ $w(e) \leftarrow w(e)\left(1 + \dfrac{\varepsilon N(e)\Delta}{u_e}\right) \forall \; e \in E;$ r $\leftarrow$ r-$\Delta$;
        end while
    end for
    phase $\leftarrow$ phase+1

$D \leftarrow \sum_{e \in E} u_e w(e);$ until D $\geq$ 1
scale_fact = $\max_{e \in E}$ flow(e)/$u_e$;
Output $\lambda$ = phase/scale_fact;

---

The values of $\varepsilon$ and $\delta$ are related: for any given $\varepsilon'>0$ (i.e., a given design arbitrarily selects a small value for $\varepsilon'$), the approximation link-partition algorithm computes a solution with objective function value within (1+$\varepsilon'$) factor of the optimum for $\varepsilon$ and $\delta$ as given in equations (11) and (12):

$$\delta = \left(\dfrac{1-\varepsilon'}{m}\right)^{1/\varepsilon} \text{ and} \quad (11)$$

$$\varepsilon = 1 - \dfrac{1}{(1+\varepsilon')^{1/3}}, \quad (12)$$

where m is the number of links in the network. A discussion of $\varepsilon$-approximation algorithms may be found in Garg and Konemann, "Faster and Simpler Algorithms for Multicommodity Flow and Other Fractional Packing Problems," 39th Annual Symposium on Foundations of Computer Science (FOCS), 1998, which is incorporated herein in its entirety by reference.

Returning to FIG. 3, at step 307 of FIG. 3, the shortest path P is computed from s(k) to t(k) under link costs w(e) $\forall e \in E$ that passes through at least one node in C. FIG. 4 shows an exemplary method that may be employed for step 307 to compute the constrained shortest path at each iteration of the algorithm.

At step 401, using Dijkstra's algorithm, the shortest cost path is computed from s(k) to all nodes in C, which is a single shortest path computation to build the shortest path tree rooted at s(k) and reaching all nodes in C. The cost of the shortest path from s(k) to node i$\in$C is denoted as $d_s(i)$. Djikstra's shortest path algorithm is described in E. Dijkstra, "A Note: Two Problems In Connection With Graphs," Numerical Mathematics, vol. 1, 1959, pp. 269-271, which is incorporated herein by reference At step 402, using Dijkstra's algorithm on the network graph having each link reversed, the shortest path is computed from each node in C to node t(k). The cost of the shortest path from each node i$\in$C to t(k) is denoted as $d_r(i)$.

At step 403, the minimum distance is $d_{min} = \min_{i \in C}[d_s(i) + d_r(i)]$ and the minimum distance is attained for node c$\in$C. Then, the constrained shortest cost path from s(k) to f(k) is generated by a concatenation of the shortest cost path from s(k) to node c and the shortest cost path from node c to t(k) (this path has cost $[d_s(c) + d_r(c)]$).

Network routing design with content filtering in accordance with one or more embodiments of the present invention may provide for the following advantages. First, content filtering is effective, since all the traffic carried by the network is filtered. Available content-filtering capabilities might be placed in nodes of the network optimally, leading to decreased bandwidth usage per connection and higher network throughput. Thus, placement of content-filtering capabilities in accordance with one or more exemplary embodiments of the present invention might result in significantly better utilization of network capacity in routing traffic to these optimally placed content-filtering nodes.

While the exemplary embodiments of the present invention are described with respect to various equations, the present invention is not limited to the form of these equations. One skilled in the art may modify these equations by scaling or form different approximate solutions to the linear programming problems described herein employing any of a number of techniques well known in the art.

The present invention may be embodied in a processor, such as a network controller or computer, and the processor may be coupled to a network or network database to receive network topology, provisioning, and capacity information used by the methods as described herein. In addition, the present invention may be employed for either wired, wireless, optical, or non-optical networks, and may be employed for either synchronous or asynchronous networks.

The present invention is not limited to content-filtering applications and might generally be employed for capacity planning of programmable networks. Network elements in programmable networks might have components with application-specific functionality. For each type of functionality, a designated set of specialized nodes might be equipped to provide the designated functionality. All application traffic streams that use a given selection of functionalities desirably transit at least one node from the set of specialized nodes for each type of functionality in the selection before leaving the network. A layered-graph approach for routing individual connections so as to satisfy the constraint of visiting at least one of the specialized nodes for each type of functionality might be employed.

As would be apparent to one skilled in the art, the various functions of capacity filtering may be implemented with circuit elements or may also be implemented in the digital domain as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

We claim:

1. A method of generating routing for one or more connections in a network of nodes interconnected by links, the method comprising the steps of:
    (a) providing a list of nodes having content filtering for the network;
    (b) formulating a routing-with-content-filtering problem (RCFP) for a relatively maximized network capacity subject to a set of constraints such that flow of each connection passes through at least one of the list of nodes having content filtering; and
    (c) solving the RCFP to generate a routing solution that specifies routing for the one or more connections through the network.

2. The method of claim 1, further comprising the step of (d) routing packets of each connection in accordance with the routing solution.

3. The method of claim 1, further comprising the step of generating the list of nodes having content filtering such that each connection has a corresponding path through the network that includes at least one content-filtering node.

4. The method of claim 1, wherein step (a) comprises the steps of:
    (a1) computing a set of shortest paths through the network for each source-destination node pair;
    (a2) generating a corresponding set of intermediate nodes for each set of shortest paths;
    (a3) formulating a hitting set problem (HSP) based on each set of intermediate nodes for a hitting node set having a relative minimum cardinality and hitting at least one node of each set of intermediate nodes; and
    (a4) solving the HSP to generate a hitting node set, the hitting set corresponding to the list of content filtering nodes.

5. The method of claim 4, wherein step (a1) generates each set of shortest paths in accordance with a k shortest path algorithm.

6. The method of claim 4, wherein step (a4) solves the HSP by the steps of:
    (i) computing, for each node a in each set of intermediate nodes, a number of inclusion sets of intermediate nodes that include the node a;
    (ii) selecting as a hitting set node the node having the maximum number of inclusion sets;
    (iii) removing each set of intermediate nodes including the hitting set node of step ((a4)ii); and
    (iv) repeating steps (a4(i)) through (a4(iv)) until no sets of intermediate nodes remain.

7. The method of claim 4, wherein step (a4) solves the HSP based on a guaranteed approximation factor algorithm.

8. The method of claim 1, wherein step (b) formulates the RCFP as:

$$\sum_{P: P \in P_k} x(P) = \lambda d(k) \; \forall \, k$$

subject to the primal constraints of:

$$\sum_{k} \sum_{P: P \in P_k} x(P) \leq u_e \; \forall \, e \in E, \text{ and}$$

$$x(P) \geq 0 \; \forall \, P \in P_k \; \forall \, k$$

to relatively maximize $\lambda$, wherein $\lambda$ is a scale factor, e is a link of the set E of links, $u_e$ is the capacity of link e, k is an integer counter denoting the kth commodity, $P_k$ denotes the set of all paths from source node s(k) to destination node t(k) of the kth commodity that pass through any content filtering node, x(P) denotes the traffic routed on path P in set $P_k$, and total demand d(k) routed for commodity k along all paths in $P_k$ is equivalent to $\lambda d(k)$.

9. The method of claim 8, wherein step (b) includes the step of formulating a dual of the RCFP.

10. The method of claim 9, wherein step (b) formulates the dual of the RCFP as:

$$\min \sum_{e \in E} u_e w(e),$$

subject to the dual constraints of:

$$\sum_{e \in E} w(e) \geq z(k) \; \forall \, P \in P_k, \forall \, k,$$

$$\sum_{k} d(k) z(k) \geq 1, \text{ and}$$

$$w(e) \geq 0 \; \forall \, e \in E$$

wherein z(k) is a variable for each commodity k corresponding to $$\sum_{P: P \in P_k} x(P) = \lambda d(k) \; \forall \, k$$

and w(e) is a weight for each link e an element of E corresponding to $$\sum_k \sum_{P:P \in P_k} x(P) \le u_e \ \forall \, e \in E.$$

11. The method of claim 10, wherein step (c) solves the RCFP by the steps of:
   (c1) initializing each weight and each flow associated with each link of the network;
   (c2) routing a demand for each connection by the steps of:
      (c2(i)) generating a shortest path for the demand through at least one node of the hitting set,
      (c2(ii)) determining an incremental amount of flow of the demand,
      (c2(iii)) routing the incremental amount of flow along the shortest path,
      (c2(iv)) updating the flow and the weight of each link based on the incremental amount of flow, and
      (c2(v)) repeating steps (c2(i)) through (c2(v)) until the demand is routed; and
   (c3) repeating steps (c1), (c2), and (c3) until the dual constraints are met.

12. The method of claim 11, further comprising the step of:
   (c4) generating a scale factor based on a maximum routed flow of a link and the capacity of the link.

13. The method of claim 1, wherein, for step (a), the network is either an electro-optical network or a packet-based network.

14. A method of generating a routing solution for a network of nodes interconnected by links and having at least one connection routed through the network, wherein 1) one or more of the nodes is included in a set of content filtering nodes, each content filtering node adapted to apply content filtering to a connection passing through the content filtering node, and 2) each connection passes through at least one content filtering node, the method comprising the steps of:
   (a) initializing each weight and each flow associated with each link of the network;
   (b) routing a demand for each connection by the steps of:
      (b(i)) generating a shortest path for the demand through at least one node of the set of content filtering nodes,
      (b(ii)) determining an incremental amount of flow of the demand,
      (b(iii)) routing the incremental amount of flow along the shortest path,
      (b(iv)) updating the flow and the weight of each link based on the incremental amount of flow, and
      (b(v)) repeating steps (b(i)) through (b(iv)) until the demand is routed; and
   (c) repeating steps (a) and (b) until one or more dual constraints are met, wherein the dual constraints minimize the maximum utilization of each link in the network.

15. The method of claim 14, further comprising the step of (d) generating a scale factor based on a maximum routed flow of a link and the capacity of the link.

16. The method of claim 15, further comprising the step of scaling either i) each link capacity or ii) each demand based on the scale factor.

17. The method of claim 14, further comprising the step of routing packets of each connection in accordance with the routing solution.

18. The method of claim 14, wherein, for step (b), the network is either an electro-optical network or a packet-based network.

19. A network comprising:
   a plurality of nodes interconnected by links and having at least one connection routed through the network, wherein:
   1) the network comprises a set of content-filtering nodes of the plurality of nodes, each content filtering node adapted to apply content filtering to a connection passing through the content filtering node;
   2) each connection is routed through the network in accordance with a routing solution such that each connection passes through at least one of the set of content-filtering nodes; and
   3) the routing solution is generated by:
      (a) providing a list of nodes having content filtering for the network, wherein each connection may reach at least one of the list of nodes having content filtering;
      (b) formulating a routing-with-content-filtering problem (RCFP) for a relatively maximized network capacity subject to a set of constraints such that each connection passes through at least one of the list of nodes having content filtering; and
      (c) solving the RCFP to generate a routing solution, the routing solution specifying routing for the one or more connections through the network so as to apply content filtering to each connection.

20. A computer-readable medium having stored thereon a plurality of instructions, the plurality of instructions including instructions which, when executed by a processor, cause the processor to implement a method for generating routing for one or more connections in a network of nodes interconnected by links, the method comprising the steps of:
   (a) providing a list of nodes having content filtering for the network;
   (b) formulating a routing-with-content-filtering problem (RCFP) for a relatively maximized network capacity subject to a set of constraints such that flow of each connection passes through at least one of the list of nodes having content filtering; and
   (c) solving the RCFP to generate a routing solution that specifies routing for the one or more connections through the network.

21. A computer-readable medium having stored thereon a plurality of instructions, the plurality of instructions including instructions which, when executed by a processor, cause the processor to implement a method for generating a routing solution for a network of nodes interconnected by links and having at least one connection routed through the network, wherein 1) one or more of the nodes is included in a set of content filtering nodes, each content filtering node adapted to apply content filtering to a connection passing through the content filtering node, and 2) each connection passes through at least one content filtering node, the method comprising the steps of:
   (a) initializing each weight and each flow associated with each link of the network;
   (b) routing a demand for each connection by the steps of:
      (b(i)) generating a shortest path for the demand through at least one node of the set of content filtering nodes,
      (b(ii)) determining an incremental amount of flow of the demand,
      (b(iii)) routing the incremental amount of flow along the shortest path,
      (b(iv)) updating the flow and the weight of each link based on the incremental amount of flow, and
      (b(v)) repeating steps (b(i)) through (b(iv)) until the demand is routed; and (c) repeating steps (a) and (b) until one or more dual constraints are met, wherein the dual constraints minimize the maximum utilization of each link in the network.

22. The method of claim 1, wherein:

the network includes (i) one or more nodes having content filtering and (ii) one or more nodes without content filtering;

flow of at least one connection is capable of being routed by either (i) a path that includes at least one node having content filtering or (ii) a path that includes no nodes having content filtering; and the RCFP problem includes a constraint that requires flow of each connection to pass through at least one node having content filtering.

23. The method of claim 19, wherein:

the network includes (i) one or more nodes having content filtering and (ii) one or more nodes without content filtering;

flow of at least one connection is capable of being routed by either (i) a path that includes at least one node having content filtering or (ii) a path that includes no nodes having content filtering; and the RCFP problem includes a constraint that requires flow of each connection to pass through at least one node having content filtering.

24. The method of claim 20, wherein:

the network includes (i) one or more nodes having content filtering and (ii) one or more nodes without content filtering;

flow of at least one connection is capable of being routed by either (i) a path that includes at least one node having content filtering or (ii) a path that includes no nodes having content filtering; and the RCFP problem includes a constraint that requires flow of each connection to pass through at least one node having content filtering.

* * * * *